United States Patent
Reinhard et al.

(10) Patent No.: US 11,820,528 B2
(45) Date of Patent: Nov. 21, 2023

(54) ELECTRONIC CONTROLLER WITH OFF-LOAD AND ANTI-STALL CAPABILITY FOR RAM AIR TURBINE VARIABLE DISPLACEMENT HYDRAULIC PUMP

(71) Applicant: Hamilton Sundstrand Corporation, Charlotte, NC (US)

(72) Inventors: Paul Reinhard, Elgin, IL (US); Gregory E. Horihan, Rockford, IL (US); David S. Behling, Belvidere, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/705,528

(22) Filed: Mar. 28, 2022

(65) Prior Publication Data
US 2023/0303265 A1   Sep. 28, 2023

(51) Int. Cl.
    B64D 41/00    (2006.01)
    B64C 13/40    (2006.01)
    F03D 9/32     (2016.01)
    F03D 9/28     (2016.01)

(52) U.S. Cl.
    CPC ........... B64D 41/007 (2013.01); B64C 13/40 (2013.01); F03D 9/28 (2016.05); F03D 9/32 (2016.05); F05B 2220/31 (2013.01); F05B 2220/7068 (2013.01); F05B 2260/406 (2013.01)

(58) Field of Classification Search
    CPC .......... B64D 41/007; B64C 13/40; F03D 9/28
    See application file for complete search history.

(56) References Cited

U.S. PATENT DOCUMENTS

| 5,064,351 A | 11/1991 | Hamey et al. |
| 5,145,324 A * | 9/1992 | Dickes ............... F03D 9/32 60/447 |
| 5,320,499 A | 6/1994 | Hamey et al. |
| 5,623,411 A | 4/1997 | Morvan |

(Continued)

FOREIGN PATENT DOCUMENTS

| EP | 0277253 B1 | 7/1992 |
| EP | 0838396 A1 | 4/1998 |

(Continued)

OTHER PUBLICATIONS

Search Report issued in European Patent Application No. 23156639.9; Application dated Feb. 14, 2023; dated Aug. 21, 2023 (9 pages).

*Primary Examiner* — Abiy Teka
(74) *Attorney, Agent, or Firm* — CANTOR COLBURN LLP

(57) ABSTRACT

An aircraft hydraulic control system includes a pump system, a fluid circuit, and a controller. The pump system includes a hydraulic pump and a ram air turbine assembly. The fluid circuit delivers hydraulic fluid to the hydraulic pump and receives the hydraulic fluid output from the hydraulic pump. The controller is in signal communication with the hydraulic pump. The controller determines a rotational frequency of a ram air turbine included in the ram air turbine assembly, and controls the hydraulic pump so as to control the flow of hydraulic fluid in the fluid circuit. The flow of hydraulic fluid in the fluid circuit controls a fluid pressure of the aircraft.

16 Claims, 2 Drawing Sheets

(56) References Cited

U.S. PATENT DOCUMENTS

| | | | |
|---|---|---|---|
| 6,145,308 A | 11/2000 | Bueche et al. | |
| 8,855,952 B2 * | 10/2014 | Spierling | F01D 21/003 |
| | | | 702/58 |
| 10,106,275 B2 | 10/2018 | Sasscer et al. | |
| 10,926,870 B2 | 2/2021 | Halsey et al. | |
| 2003/0020419 A1 * | 1/2003 | Ichinose | F02C 9/28 |
| | | | 318/140 |
| 2016/0201697 A1 | 7/2016 | Campbell et al. | |
| 2016/0341193 A1 | 11/2016 | Du et al. | |
| 2018/0335056 A9 | 11/2018 | Guo et al. | |
| 2020/0284326 A1 | 9/2020 | Larson et al. | |

FOREIGN PATENT DOCUMENTS

| | | |
|---|---|---|
| EP | 2481916 A1 | 8/2012 |
| GB | 950586 A | 2/1964 |
| WO | 3501326 A1 | 3/1985 |

\* cited by examiner

US 11,820,528 B2

ELECTRONIC CONTROLLER WITH OFF-LOAD AND ANTI-STALL CAPABILITY FOR RAM AIR TURBINE VARIABLE DISPLACEMENT HYDRAULIC PUMP

BACKGROUND

Embodiments of the present disclosure are directed generally to aircraft systems, and more specifically, to aircraft hydraulic systems.

Most modern aircraft rely on hydraulic power for many purposes including moving flight control surfaces, deploying landing gear, and steering the aircraft while it is not in flight. During normal operation of the aircraft, this hydraulic power is provided by one or more hydraulic circuits on-board the aircraft which receive a flow of hydraulic fluid from pumps driven either directly or indirectly by the main propulsion engines of the aircraft.

It has been common practice for many years to equip aircraft with a Ram Air Turbine (RAT) to provide a source of emergency power. Generally, the RAT is stowed inside of the fuselage or wing of the aircraft, and can be deployed (e.g., manually by the pilot/copilot) in response to a deployment event, e.g. in the event that all power is lost from the propulsion engines while the aircraft is in flight. Accordingly, the external airstream induces rotation of the RAT to continue providing hydraulic power to a load. For example, the hydraulic power can be used for moving flight control surfaces, deploying landing gear, and steering the aircraft safely to a stop after touch-down are required so that the aircraft may be guided to a safe landing.

BRIEF DESCRIPTION

According to a non-limiting embodiment, an aircraft hydraulic control system includes a pump system, a fluid circuit, and a controller. The pump system includes a hydraulic pump and a ram air turbine assembly. The fluid circuit delivers hydraulic fluid to the hydraulic pump and receives the hydraulic fluid output from the hydraulic pump. The controller is in signal communication with the hydraulic pump. The controller determines a rotational frequency of a ram air turbine included in the ram air turbine assembly, and controls the hydraulic pump so as to control the flow of hydraulic fluid in the fluid circuit. The flow of hydraulic fluid in the fluid circuit controls a fluid pressure of the aircraft.

In addition to one or more of the features described herein, or as an alternative, further embodiments may include a swash plate and a plate actuator. The swash plate is configured to operate according to a plurality of different adjustable plate positions that vary the flow of the hydraulic fluid output from the hydraulic pump. The plate actuator is coupled to the swash plate and configured to adjust the plate position to control the flow of the hydraulic fluid in the fluid circuit.

In addition to one or more of the features described herein, or as an alternative, further embodiments may include a feature, wherein the controller outputs a command signal that controls the plate actuator to adjust the plate position of the swash plate.

In addition to one or more of the features described herein, or as an alternative, further embodiments may include a feature, wherein the ram air turbine assembly further comprises a permanent magnet generator (PMG) rotatably coupled to the ram air turbine. The PMG is configured to generate a voltage signal in response to the rotation of the ram air turbine.

In addition to one or more of the features described herein, or as an alternative, further embodiments may include a feature, wherein the controller is in signal communication with the PMG and is powered in response to receiving the voltage signal output from the PMG. The controller is further configured to determine a rotation signal based on the voltage signal generated in response to rotating the PMG.

In addition to one or more of the features described herein, or as an alternative, further embodiments may include a pressure sensor in fluid communication with the fluid circuit. The pressure sensor is configured to output a pressure signal indicative of the fluid pressure based on the hydraulic fluid. The controller actively adjusts the plate position based at least in part on the pressure signal to control the flow of the hydraulic fluid in the fluid circuit.

In addition to one or more of the features described herein, or as an alternative, further embodiments may include a feature, wherein the controller compares the fluid pressure indicated by the pressure signal to a target fluid pressure and adjusts the plate position such that the fluid pressure meets the target fluid pressure.

In addition to one or more of the features described herein, or as an alternative, further embodiments may include a feature, wherein the controller continuously compares the fluid pressure to the target fluid pressure and actively adjusts the plate position to maintain the fluid pressure at the target fluid pressure.

In addition to one or more of the features described herein, or as an alternative, further embodiments may include a feature, wherein the controller compares the rotational frequency to a targeted operational frequency and controls the hydraulic pump based on the comparison between the rotational frequency to the targeted operational frequency.

In addition to one or more of the features described herein, or as an alternative, further embodiments may include a feature, wherein in response to the rotational frequency falling below the targeted operational frequency, the controller outputs a plate control signal to control the plate actuator and adjust the plate position to reduce the flow of hydraulic fluid output from the hydraulic pump thereby increasing the rotational frequency toto meet or exceed the targeted operational frequency.

According to another non-limiting embodiment, a method is provided for controlling an hydraulic control system included in an aircraft. The method comprises delivering, via a fluid circuit, hydraulic fluid to a hydraulic pump, and outputting, from the hydraulic pump the hydraulic pump to the fluid circuit. The method further comprises determining, using a controller, a rotational frequency of a ram air turbine included in a ram air assembly. The method further comprises controlling, using the controller, the hydraulic pump so as to control a flow of the hydraulic fluid in the fluid circuit to control a fluid pressure of the aircraft.

In addition to one or more of the features described herein, or as an alternative, further embodiments may include operating a swash plate according to a plurality of different adjustable plate positions that vary the flow of the hydraulic fluid output from the hydraulic pump; and adjusting a plate actuator coupled to the swash plate so as to adjust the plate position to control the flow of the hydraulic fluid in the fluid circuit.

In addition to one or more of the features described herein, or as an alternative, further embodiments may include outputting, from a controller, a command signal that controls the plate actuator to adjust the plate position of the swash plate.

In addition to one or more of the features described herein, or as an alternative, further embodiments may include driving a rotation of a permanent magnet generator (PMG) using the ram air turbine, and generating a voltage signal from the PMG in response to the rotation of the ram air turbine.

In addition to one or more of the features described herein, or as an alternative, further embodiments may include powering the controller using the voltage signal output from the PMG.

In addition to one or more of the features described herein, or as an alternative, further embodiments may include determining, by the controller, a rotation signal based on the voltage signal generated in response to rotating the PMG.

In addition to one or more of the features described herein, or as an alternative, further embodiments may include outputting a pressure signal from a pressure sensor that is in fluid communication with the fluid circuit, the pressure signal indicative of the fluid pressure based on the hydraulic fluid.

In addition to one or more of the features described herein, or as an alternative, further embodiments may include actively adjusting the plate position using the controller based at least in part on the pressure signal to control the flow of the hydraulic fluid in the fluid circuit.

In addition to one or more of the features described herein, or as an alternative, further embodiments may include comparing, by the controller, the fluid pressure indicated by the pressure signal to a target fluid pressure; and outputting from the controller a plate control signal to adjust the plate position such that the fluid pressure meets the target fluid pressure.

In addition to one or more of the features described herein, or as an alternative, further embodiments may include continuously comparing, by the controller, the fluid pressure to the target fluid pressure; and actively adjusting, by the controller, the plate position to maintain the fluid pressure at the target fluid pressure.

In addition to one or more of the features described herein, or as an alternative, further embodiments may include comparing, by the controller, the rotational frequency to a targeted operational frequency.

In addition to one or more of the features described herein, or as an alternative, further embodiments may include determining, by the controller, the rotational frequency falling below the targeted operational frequency.

In addition to one or more of the features described herein, or as an alternative, further embodiments may include, in response to the rotational frequency falling below the targeted operational frequency, controlling, by the controller the plate actuator to adjust the plate position to reduce the flow of hydraulic fluid output from the hydraulic pump thereby increasing the rotational frequency to meet or exceed the targeted operational frequency.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures. A non-limiting embodiment of the present disclosure provides an aircraft hydraulic system that includes an electronic controller that controls a ram air turbine (RAT) variable displacement hydraulic pump.

A permanent magnet generator (PMG) integrated with the RAT assembly is used to provide voltage to power the controller and an actuator that adjusts a swash plate of the hydraulic pump. The rotation signal associated with the PMG is used by the controller to monitor the angular frequency associated with the rotating PMG and control the stroke of the hydraulic pump to operate the RAT above a targeted operational frequency to achieve a target regulated flow of the hydraulic system. Accordingly, the resulting pump design allows for eliminating costly and difficult to manufacture spools and ported housings in favor of an electro-mechanical servo to control the position of the pump swash plate, thereby controlling output flow of the hydraulic pump. In addition, maintaining the power integral to the RAT allows it to remain independent of the aircraft power systems.

In one or more non-limiting embodiments, the electronic controller monitors the angular frequency associated with the rotating PMG and controls the stroke of the hydraulic pump to operate the RAT at or above a targeted operational frequency to achieve a target regulated flow of the hydraulic system. In the event the frequency of the PMG falls below a threshold value, the controller can proportionally destroke the pump to reduce mechanical load demand on the turbine and increase the frequency to maintain regulated flow. Once the rotational frequency rises to meet the targeted operational frequency, the controller 106 can continue adjusting the swash plate angle to sustain the regulated flow. In this manner, pump flow can be reduced to no output which sustains the target frequency of turbine to provide an anti-stall capability. Reducing the pump flow also can prevent the turbine frequency from dropping to zero during momentary interruptions in wind velocity due to aircraft maneuvers, control surface movements, landing gear deployment or other anomalies which may interrupt wind at the ram air turbine.

Figure 1:
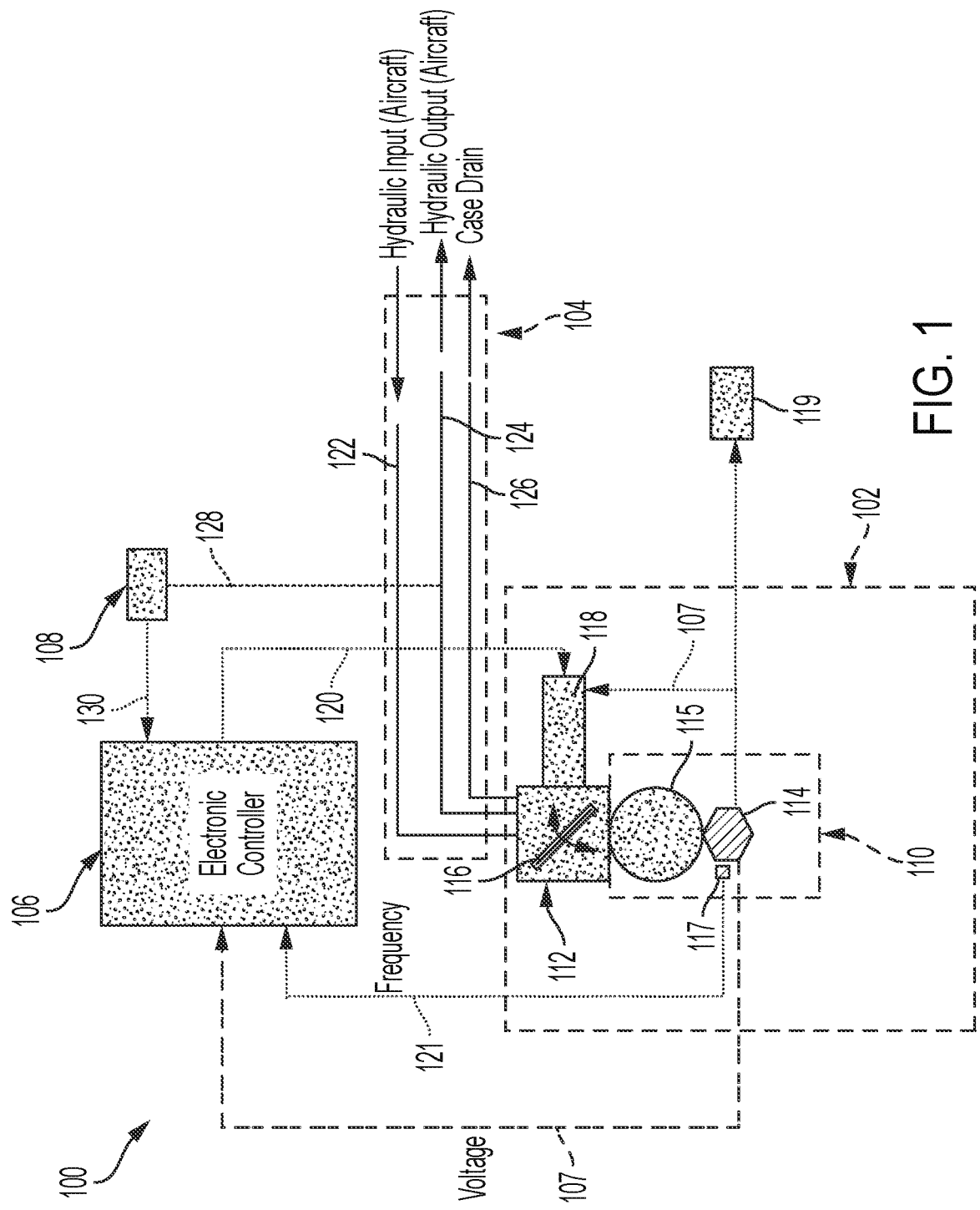
FIG. 1 is a block diagram depicting a RAT in fluid communication with an aircraft hydraulic system according to a non-limiting embodiment.

Turning now to FIG. 1, a RAT with aircraft hydraulic system 100 interfaces is illustrated according to a non-limiting embodiment of the present disclosure. The hydraulic system 100 includes a pump system 102, a fluid circuit 104, and a controller 106. The controller 106 is configured to monitor a fluid pressure associated with the fluid circuit 104 via a fluid pressure sensor 108. The fluid pressure sensor 108 can be implemented using a pressure transducer, for example, and can be installed at various locations of the hydraulic system 100. For example, the pressure sensor 108 can be located externally from the fluid circuit 104, within the fluid circuit 104, or in a hydraulic pump included in the pump system 102.

The pump system 102 is in fluid communication with the fluid circuit 104. The pump system 102 includes a ram air turbine (RAT) assembly 110 and a hydraulic pump 112. In one or more non-limiting embodiments, the hydraulic pump 112 is integrated with the RAT assembly 110. In some embodiments, the hydraulic pump 112 can be implemented as an electric motor pump (EMP) or an alternating current motor pump (ACMP) and located on the aircraft remotely from the RAT assembly 110. In this case, the hydraulic pump 112 is employed with a dedicated pump controller. The dedicated pump controller logic can be modified to operate in conjunction with the EMP or ACMP. The RAT assembly 110 includes at rotatable RAT 115 and an integrated permanent magnet generator (PMG) 114. The RAT 115 includes a turbine shaft (not shown) that rotates in response to rotation of the RAT 115. The PMG 114 includes a PMG rotor (not shown) and the PMG stator (not shown). The PMG rotor is coupled to the turbine shaft of the RAT 115 (e.g., via a gear box or clutch). Rotation of the RAT 115 induces rotation of the PMG 114 (e.g., the PMG rotor), which in turn induces voltage in the PMG stator Voltages signals 107 generated by the PMG 114 can be used to power the controller 106 and/or the plate actuator 118, along with other electrical loads 119 of the aircraft.

The hydraulic pump 112 can be constructed as a variable displacement hydraulic pump, for example, and includes a swash plate 116 and a plate actuator 118. The swash plate 116 is configured to operate in a plurality of different plate positions that vary the flow of hydraulic fluid output from the hydraulic pump. For example, the swash plate 116 can be coupled to the hydraulic pump shaft at a tilted angle (e.g., with respect to the pump shaft) and rotates along with the hydraulic pump shaft in response to rotation of the permanent magnet generator 114 (e.g. the PMG rotor). One or more pistons included in the hydraulic pump 112 are coupled to the swash plate 116. Extending or compressing the pistons in turn adjusts the angle of the swash plate 116. In this manner, the plate position (e.g., angle) of the swash plate 116 can be adjusted over a range of different angles to control (e.g. vary) the flow of hydraulic fluid output from the hydraulic pump 112. Varying the flow of hydraulic fluid output from the hydraulic pump 112 in turn changes the fluid pressure of the aircraft. In this manner, controlling the flow of the hydraulic fluid in turn controls the fluid pressure of the aircraft.

The plate actuator 118 is coupled to the swash plate 166 (e.g., via the pistons using linkages, valves, springs, etc.) and is configured to change the inclination angle of the swash plate 116 based on a plate control signal output 120 by the controller 106. In one or more non-limiting embodiments, the plate actuator 118 can be constructed as an elector-mechanical servo such as, for example, a rotary servo or linear servo. The packaging needs of the hydraulic pump design can dictate the type of elector-mechanical servo that is implemented.

The fluid circuit 104 includes a fluid input line 122, a fluid output line 124, and a case drainage line 126. The fluid input line 122 delivers hydraulic fluid from a reservoir (not shown) to the hydraulic pump 112. The fluid output line 124 receives hydraulic fluid output from the hydraulic pump 112. The case drainage line 126 can relieve excess fluid and drain it back to the output line 124 and into the reservoir. For example, case drainage can be routed internal to the hydraulic pump 112, which can facilitate a product compliant with a dual-line hydraulic system. The fluid pressure sensor 108 includes a sensor input 128 in fluid communication with the fluid output line 124 and a sensor output 130 in signal communication with the controller 106. The fluid pressure sensor 108 is configured to output a voltage signal 130 (via the sensor output 130) indicative of a pressure of the hydraulic system 100 based on the pressure of the hydraulic fluid flowing through the fluid output line 124.

The controller 106 receives a voltage rotation signal 121 from the rotation sensor 117 and a voltage pressure signal 130 output from the pressure sensor 108. In some non-limiting embodiments, the rotation sensor 117 can be omitted and controller 106 can utilize the voltage waveform signal output from the PMG 114 to perform power via rectification and/or perform zero-crossing measurements to monitor rotational frequency and/or speed of the PMG 114. The controller 106 converts the analog waveform of the voltage rotation signal 121 into a direct current voltage (VDC). In one or more non-limiting embodiments, the VDC can be used to power one of, or a combination of, the controller 106, the plate actuator 118, and the pressure sensor 108. The controller 106 also utilizes the voltage rotation signal 121 to determine a rotational frequency associated with the RAT 115 and/or the PMG 114 as described in greater detail below.

The voltage pressure signal 130 is utilized by the controller 106 to determine a pressure of the hydraulic system 100. Based on the pressure, the controller 106 outputs the plate control signal 120 to the plate actuator 118, which in turn controls the plate actuator 118 to adjust the swash plate 116 thereby controlling the output of the hydraulic fluid from the hydraulic pump 112. In one or more non-limiting embodiments, the controller 106 can actively adjust the position of the swash plate 116 to actively adjust the flow of the hydraulic fluid and sustain a target fluid pressure of the aircraft. For example, the voltages of the voltage signal 130 can be mapped to different fluid pressures, and the controller 106 can map the voltage indicated by the voltage signal to the corresponding pressure value to determine the pressure of the hydraulic system 100. Accordingly, the controller 106 can compare the determined pressure to pressure threshold value. When the determined pressure is below the pressure threshold value, the controller 106 can output the control signal 130 to command the plate actuator 118 to increase the plate angle of the swash plate 116. The increased angle increases the amount of hydraulic fluid output from the hydraulic pump 112, thereby raising the aircraft hydraulic system pressure. When the determined pressure is above the pressure threshold value, the controller 106 can output the plate control signal 120 to command the plate actuator 118 to decrease the plate angle of the swash plate 116. The decreased angle reduces the amount of hydraulic fluid output from the hydraulic pump 112, thereby lowering the aircraft hydraulic system pressure.

As described herein, the controller 106 utilizes the electrical signal 121 output from the a rotation sensor 117 to determine the rotational frequency of the RAT 115, and in turn monitor control the hydraulic pressure of the aircraft hydraulic system 100. During start-up following deployment of the RAT 115, the rotational frequency is 0 Hz, or substantially about 0 Hz, and the hydraulic pump 112 is at full displacement. In response to receiving the voltage signal 121 and determining a rotation frequency of the RAT 115 (e.g., based on the rotation signal provided by the PMG), the controller 106 outputs a plate command signal 120 that controls the plate actuator 118 to adjust the plate angle of the swash plate 116 and destroke the hydraulic pump 112 until the RAT 115 achieves a target frequency (e.g., a normal operational frequency of RAT 115). In this manner, the hydraulic system 100 can utilize the rotational frequency and voltage provided by the PMG 114 to ensure the hydraulic pump 112 is offloaded so that that the torque demand of the hydraulic pump 112 does not overpower the RAT 115 during startup thereby allowing the RAT 115 to start.

Once the target frequency is achieved, the controller 106 monitors the fluid pressure via the pressure signal 130 to actively regulate the flow of hydraulic fluid through the aircraft hydraulic system 300. In one or more non-limiting embodiments, the controller actively controls the flow by continuously adjusting the angle of the swash plate 116, which in turn achieves a target aircraft hydraulic system pressure. The flow of hydraulic fluid that achieves the target aircraft hydraulic system pressure is referred to herein as the "regulated flow."

As the aircraft operates, the controller 106 continues to monitor the rotational frequency indicated by the voltage signal 121 while actively adjusting the plate angle of the swash plate 116 to sustain the regulated flow. In the event the rotational frequency drops below a threshold frequency value, the controller 106 can detect a possible stall condition. Accordingly, the controller outputs the plate command signal 120 that controls the plate actuator 118 to proportionally destroke the hydraulic pump 112. Destroking the hydraulic pump 112 at this stage reduces the mechanical load demand on the RAT 115 and increases its rotational frequency so as to maintain the regulated flow. In one or more non-limiting embodiments, the controller 106 is configured to stop hydraulic fluid flow output from the hydraulic pump 112 in order to recover and maintain the rotational frequency of the RAT, at least for short periods of time. In this manner, the controller 106 provides an anti-stall mode that reduces the possibility of the RAT rotational frequency dropping to 0 Hz during momentary interruptions in wind velocity due to aircraft maneuvers, control surface movements, landing gear deployment or other anomalies which may interrupt input air flow used to drive the rotation of the RAT 115.

Figure 2:
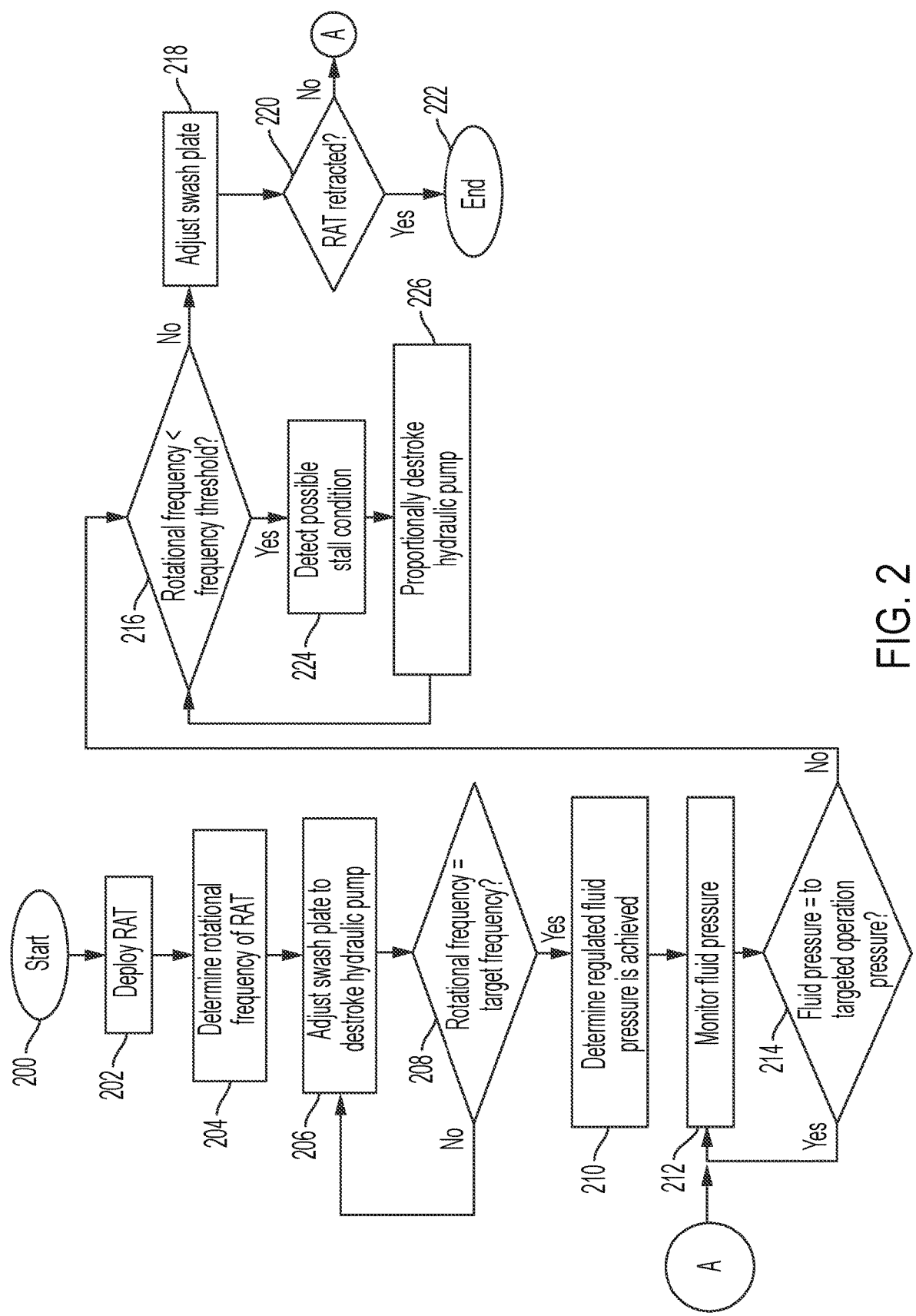
FIG. 2 is a flow diagram illustrating a method of controlling RAT output to an aircraft hydraulic system according to a non-limiting embodiment.

With reference now to FIG. 2, a method of controlling an aircraft hydraulic control system is illustrated according to a non-limiting embodiment. The method begins at operation 200, and at operation 202 the RAT of the aircraft is deployed. At operation 204, a rotational frequency of the RAT is determined. At operation 206, a hydraulic pump swash plate is adjusted to destroke the hydraulic pump. At operation 208, the rotational frequency is compared to a target frequency. When the rotational frequency does not meet the target frequency, the method returns to operation 206 and adjusts the plate position of the swash plate until the rotational frequency is equal, or substantially equal, to the target frequency.

When the rotational frequency does meet the target frequency, a regulated fluid pressure is determined at operation 210. At operation 212, the fluid pressure of the aircraft is monitored. At operation 214, the fluid pressure is compared to a targeted operation pressure. When the fluid pressure is equal, or substantially equal, to the targeted operation pressure, the method returns to operation 212 and continues monitoring the fluid pressure. When, however, the fluid pressure is not equal to the targeted operation pressure, the proceeds to operation 216 and compares the rotational frequency to a frequency threshold. When the rotational frequency is not less than the frequency threshold, the swash plate is adjusted at operation 218. At operation 220 a determination is made as to whether the RAT remains deployed or is retracted. When the RAT remains deployed, the method returns to operation 212 and continues monitoring the fluid pressure. When, however, the RAT is retracted, the method ends at operation 222.

Returning to operation 216, when the rotational frequency is less than the frequency threshold a possible stall condition is detected at operation 224. At operation 226, the hydraulic pump swash plate is adjusted to proportionally destroke the hydraulic pump. Accordingly, the method can repeat operations 216, 224 and 226 until the rotational frequency is not less than frequency threshold and can proceed to operation 218.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. As used herein, the terms "about" and "substantially" are intended to include the degree of error associated with measurement of the particular quantity based upon the equipment available at the time of filing the application. For example, the terms may include a range of ±8%, or 5%, or 2% of a given value or other percentage change as will be appreciated by those of skill in the art for the particular measurement and/or dimensions referred to herein. It should be appreciated that relative positional terms such as "forward," "aft," "upper," "lower," "above," "below," and the like are with reference to normal operational attitude and should not be considered otherwise limiting.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An hydraulic control system included in an aircraft, the hydraulic control system comprising:
   a pump system including a hydraulic pump and a ram air turbine assembly, the ram air turbine assembly comprising a permanent magnet generator (PMG) rotatably coupled to the ram air turbine, the PMG configured to generate a voltage signal in response to the rotation of the ram air turbine;
   a fluid circuit configured to deliver hydraulic fluid to the hydraulic pump and to receive the hydraulic fluid output from the hydraulic pump; and
   a controller in signal communication with the hydraulic pump, the controller configured to determine a rotational frequency of a ram air turbine included in the ram air assembly, and to control the hydraulic pump so as to control the flow of hydraulic fluid in the fluid circuit,
   wherein the flow of hydraulic fluid in the fluid circuit controls a fluid pressure of the aircraft, and
   wherein the controller is in signal communication with the PMG and is powered in response to receiving the voltage signal output from the PMG, and wherein the controller determines a rotation signal based on the voltage signal generated in response to rotating the PMG.

2. The aircraft hydraulic control system of claim 1, wherein the hydraulic pump comprises:
 a swash plate configured to operate according to a plurality of different adjustable plate positions that vary the flow of the hydraulic fluid output from the hydraulic pump; and
 a plate actuator coupled to the swash plate and configured to adjust the plate position to control the flow of the hydraulic fluid in the fluid circuit.

3. The aircraft hydraulic control system of claim 2, wherein the controller outputs a command signal that controls the plate actuator to adjust the plate position of the swash plate.

4. The aircraft hydraulic control system of claim 1, further comprising:
 a pressure sensor in fluid communication with the fluid circuit, the pressure sensor configured to output a pressure signal indicative of the fluid pressure based on the hydraulic fluid,
 wherein the controller actively adjusts the plate position based at least in part on the pressure signal to control the flow of the hydraulic fluid in the fluid circuit.

5. The aircraft hydraulic control system of claim 4, wherein the controller compares the fluid pressure indicated by the pressure signal to a target fluid pressure and adjusts the plate position such that the fluid pressure meets the target fluid pressure.

6. The aircraft hydraulic control system of claim 5, wherein the controller continuously compares the fluid pressure to the target fluid pressure and actively adjusts the plate position to maintain the fluid pressure at the target fluid pressure.

7. The aircraft hydraulic control system of claim 4, wherein the controller compares the rotational frequency to a targeted operational frequency and controls the hydraulic pump based on the comparison between the rotational frequency to the targeted operational frequency.

8. The aircraft hydraulic control system of claim 7, wherein in response to the rotational frequency falling below the targeted operational frequency, the controller outputs a plate control signal to control the plate actuator and adjust the plate position to reduce the flow of hydraulic fluid output from the hydraulic pump thereby increasing the rotational frequency toto meet or exceed the targeted operational frequency.

9. A method of controlling an hydraulic control system included in an aircraft, the method comprising:
 delivering, via a fluid circuit, hydraulic fluid to a hydraulic pump;
 outputting, from the hydraulic pump the hydraulic fluid to the fluid circuit;
 driving a rotation of a permanent magnet generator (PMG) using a ram air turbine included in a ram air assembly;
 generating a voltage signal from the PMG in response to the rotation of the ram air turbine;
 powering a controller using the voltage signal output from the PMG;
 determining, using the controller, a rotational frequency of the ram air turbine included in the ram air assembly;
 determining, by the controller, a rotation signal based on the voltage signal generated in response to rotating the PMG; and
 controlling, using the controller, the hydraulic pump so as to control a flow of the hydraulic fluid in the fluid circuit to control a fluid pressure of the aircraft.

10. The method of claim 9, further comprising:
 operating a swash plate according to a plurality of different adjustable plate positions that vary the flow of the hydraulic fluid output from the hydraulic pump; and
 adjusting a plate actuator coupled to the swash plate so as to adjust the plate position to control the flow of the hydraulic fluid in the fluid circuit.

11. The method of claim 10, further comprising outputting, from a controller, a command signal that controls the plate actuator to adjust the plate position of the swash plate.

12. The method of claim 9, further comprising:
 outputting a pressure signal from a pressure sensor that is in fluid communication with the fluid circuit, the pressure signal indicative of the fluid pressure based on the hydraulic fluid; and
 actively adjusting the plate position using the controller based at least in part on the pressure signal to control the flow of the hydraulic fluid in the fluid circuit.

13. The method of claim 12, further comprising:
 comparing, by the controller, the fluid pressure indicated by the pressure signal to a target fluid pressure; and
 outputting from the controller a plate control signal to adjust the plate position such that the fluid pressure meets the target fluid pressure.

14. The method of claim 13, further comprising continuously comparing, by the controller, the fluid pressure to the target fluid pressure; and
 actively adjusting, by the controller, the plate position to maintain the fluid pressure at the target fluid pressure.

15. The method of claim 14, further comprising comparing, by the controller, the rotational frequency to a targeted operational frequency.

16. The method of claim 15, further comprising:
 determining, by the controller, the rotational frequency falling below the targeted operational frequency; and
 in response to the rotational frequency falling below the targeted operational frequency, controlling, by the controller the plate actuator to adjust the plate position to reduce the flow of hydraulic fluid output from the hydraulic pump thereby increasing the rotational frequency to meet or exceed the targeted operational frequency.

* * * * *